United States Patent [19]

Ohkawa

[11] 3,930,441

[45] Jan. 6, 1976

[54] DEVICE FOR PROCESSING DOUGH

[75] Inventor: Nobuyoshi Ohkawa, Amagasaki, Japan

[73] Assignee: Daieigiken, Inc., Amagasaki, Japan

[22] Filed: Mar. 12, 1974

[21] Appl. No.: 450,491

[52] U.S. Cl. ............... 99/450.6; 425/223; 425/436
[51] Int. Cl.² ..................... A21C 9/06; A21C 11/00
[58] Field of Search ....... 99/353, 427, 450.1, 450.6; 425/223, 224, 436

[56] References Cited
UNITED STATES PATENTS

| | | | |
|---|---|---|---|
| 3,112,528 | 12/1963 | Czerkas | 425/224 X |
| 3,565,014 | 2/1971 | Mendoza | 425/223 X |
| 3,669,007 | 6/1972 | Pulici | 99/450.6 |

*Primary Examiner*—Harvey C. Hornsby
*Assistant Examiner*—Alan Cantor
*Attorney, Agent, or Firm*—Tab T. Thein

[57] ABSTRACT

Device for processing dough, specifically one that forms dough sheets having a desired thickness and bakes them. Dough in a hopper is injected from a flat nozzle by a gear pump and stuck onto the rotating drum. The latter is heated and the dough sheet is baked on it. The sheet is released from the drum by a releasing plate contacted with the drum.

3 Claims, 7 Drawing Figures

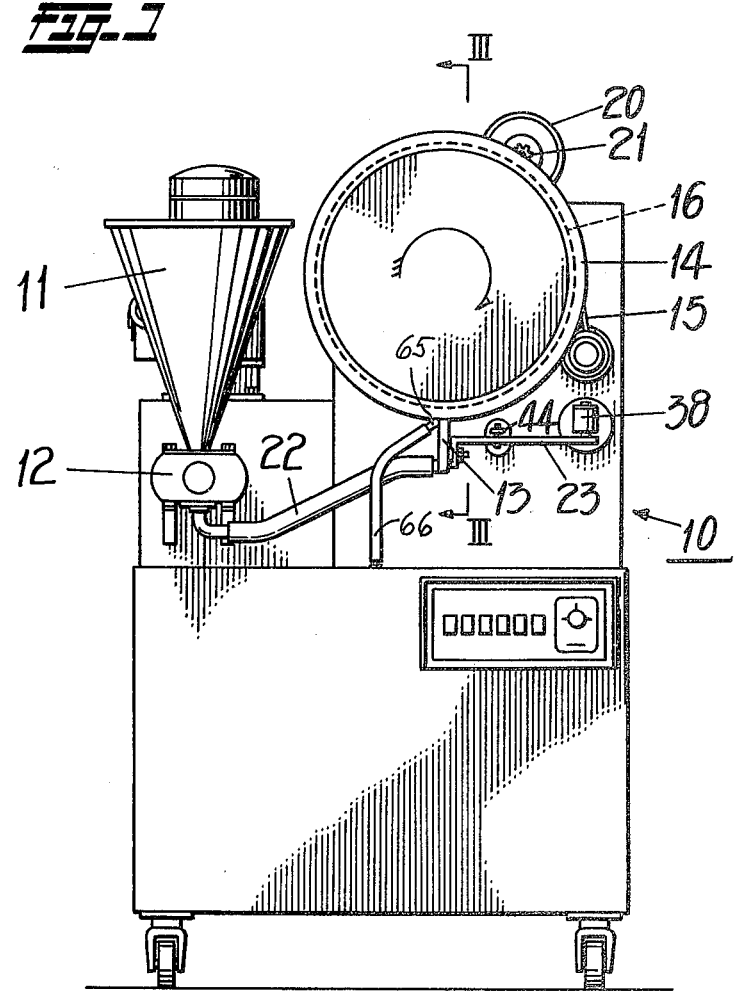

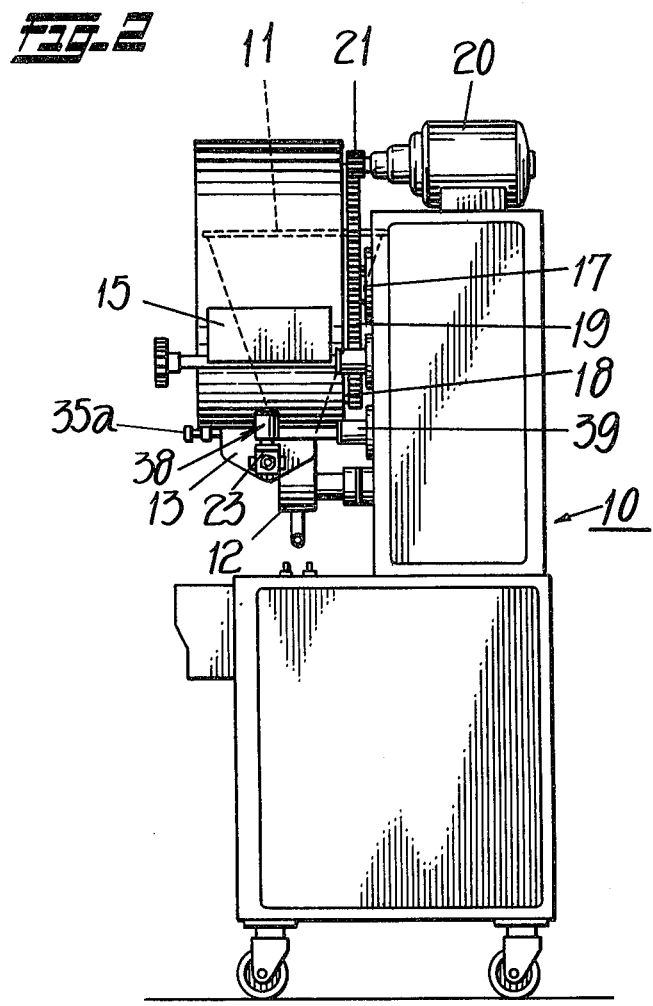

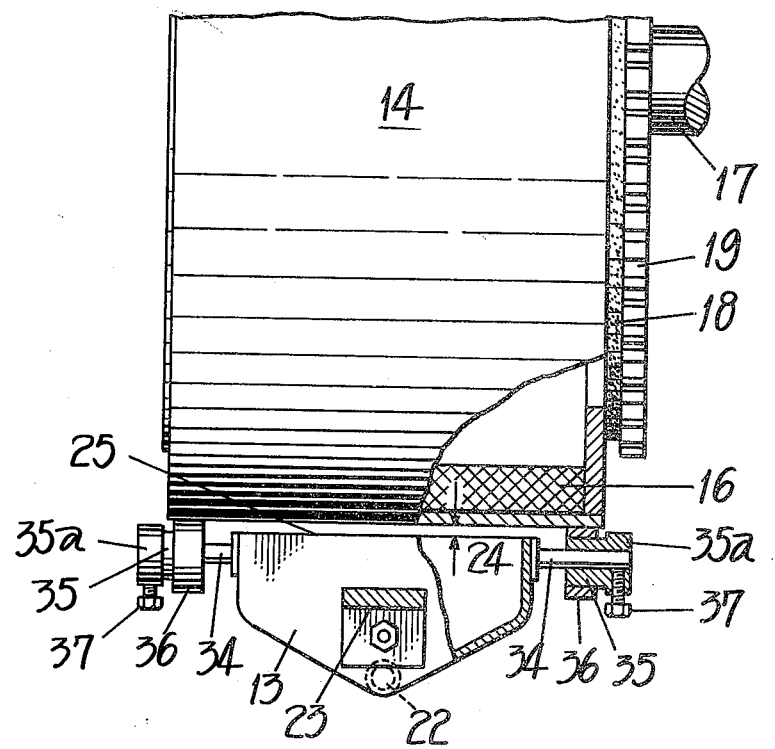
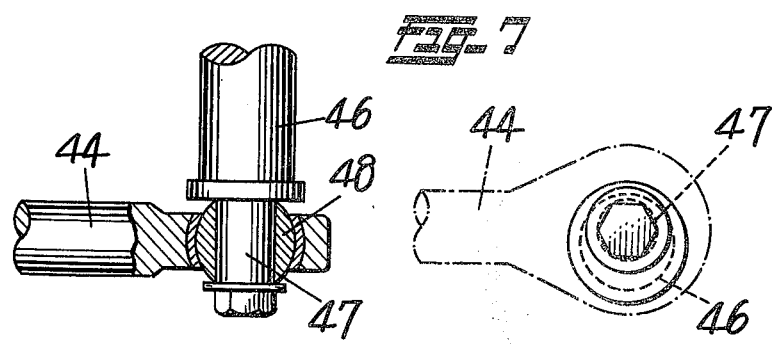

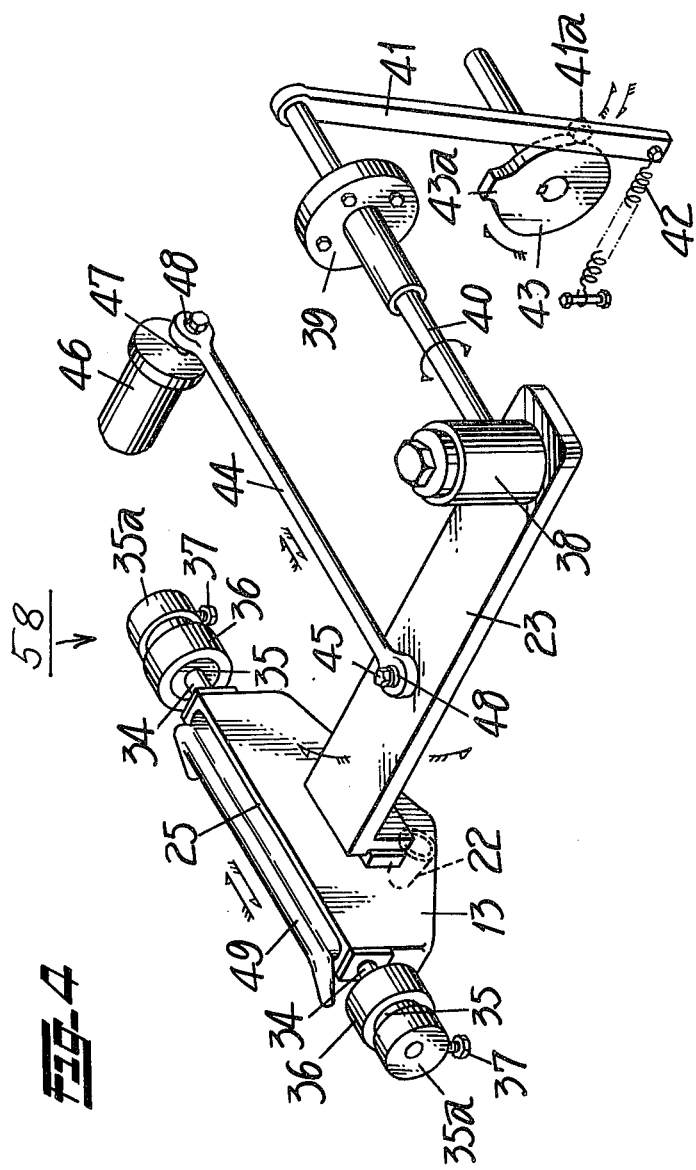

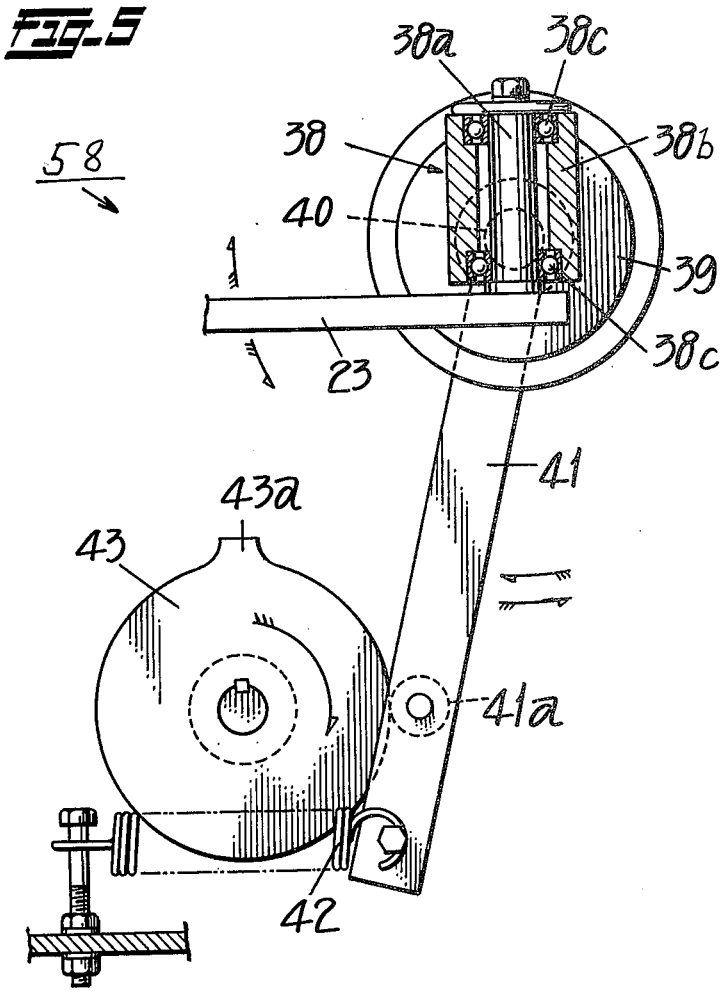

DEVICE FOR PROCESSING DOUGH

This invention provides a device for processing dough, for forming and baking dough sheets, and which forms such sheets continuously and bakes them. The thickness of the sheets can be controlled.

In the past, raw dough sheets made by handcraft were used for the wrapping of certain Japanese foods, such as known under the names Gyoza and Syumai, which are sorts of rolled foods. Higher speeds of production and uniform quality of such products are strongly desirable today. In frying a product using a raw dough sheet containing much water, if the water is not sufficiently removed, the cooked food will not taste good. In addition, the water contained in a raw dough sheet causes bacteria to grow in the food, which is undesirable, and the food cannot be kept for long periods of time.

Therefore, the object of this invention is to provide a device for forming with high speed dough sheets for use with Gyoza and Syumai and similar food products.

A further object of the invention is to provide a device for baking continuously the above-mentioned dough sheets which contain little water. The primary points of the invention are materialized in a device having a flat nozzle which oscillates in the longitudinal direction, and moves toward and away from a rotating drum at intervals, when dough is injected from the flat nozzle on the outer circular surface of the drum which has a heater in it. Dough sheets containing little water and having uniform quality can be produced continuously with this device.

It should be added at this point that this invention is closely related to those of other applications, filed simultaneously herewith, namely one on a "Device for Wrapping Sheets around Food in Rolled Form and Other Food Processing Devices" (incorporating devices for supplying a mixture to dough sheets, another for doubling the sheets, and one for bending them); another on a "Device for Wrapping Sheets around Food"; yet another on a "Device for Conveying Rolled Food"; and finally one on a "Dough Processing Device" (preventing dough from sticking), the latter being now U.S. Pat. No. 3,881,404 of May 6, 1975. These applications of the inventor were all filed on Mar. 12, 1974, respectively under Ser. Nos. 450,489, -93, -90 and -92.

Other objects and many of the attendant advantages of the invention will be readily appreciated as the same becomes better understood by reference to the following detailed description, when considered with the accompanying drawings, wherein FIG. 1 is a front view of a device for producing dough sheets and baking them, in relation to the inventive device for processing dough, for forming dough sheets of a desired thickness;

FIG. 2 is a right-hand side view of the device of FIG. 1;

FIG. 3 is a partial, sectional, enlarged side view along line III — III of FIG. 1;

FIG. 4 is a perspective view of the most important portions of the inventive device for processing dough;

FIG. 5 is a front view of a mechanism for vertical movement at intervals of a flat nozzle;

FIG. 6 is a sectional view of a mechanism for horizontally oscillating the flat nozzle; and FIG. 7 is a side view of FIG. 6.

Referring now to FIGS. 1 to 3, a device 10 for producing dough sheets and baking them has a hopper 11, a gear pump 12, a flat, slit nozzle 13, a rotating drum 14 and a releasing plate 15. The pump 12 and the nozzle 13 are connected by a flexible tube 22. A heater 16 is equipped in the inner circular surface of the drum 14 (see FIG. 3) and a large gear 19 is fixed to the back of the drum 14. An adiabatic insulating material 18 is inserted between the drum 14 and the gear 19.

The center of the back of the drum 14 is supported by a shaft 17 so that it can rotate freely. A motor 20 is provided above the device 10. A smaller gear or pinion 21, fixed to the shaft of the motor 20, is engaged with said large gear 19. The drum 14 is rotated by a reduction gear connected to the motor 20, actually constituted by gears 19 and 21.

The flat nozzle 13 is fixed to one end of a supporting arm 23 of the device 10, leaving a clearance 24 (see FIG. 3) with the drum, so that an outlet orifice 25 of the nozzle faces the outer circular surface at the bottom of the drum 14. The arm 23 has a structure to be described later. The clearance 24 is adjustable by means of a mechanism to be explained.

A short shaft 34 is fixed to both upper sides of the nozzle 13 horizontally, and eccentric roller 35 being connected with each shaft 34 at a small distance, and a cylindrical member 36 being attached to each roller 35. The member 36 can rotate coaxially outside the roller 35. It should be noted that the latter is fixed to the shaft 34 by means of a screw 37 so that it cannot rotate; the member 36 which rotates in unison with the drum 14 is not fixed to the roller 35. The member 36 is contacted with the outer circular surface of the drum 14. An operating knob 35a having a large diameter is provided at the outside portion of the roller 35, and the screw 37 is used in this knob 35a.

The clearance 24 is adjusted by the rotation of the roller 35. When the desired clearance is obtained, the roller 35 is fixed to the shaft 34 by tightening the screw 37 into or against the shaft 34. Referring now to FIG. 4, a connecting mechanism 38 is secured to the other end of the arm 23 (the earlier-mentioned end has the flat nozzle 13 attached to it). As shown in FIG. 5, the mechanism 38 includes a vertical shaft 38a and a rotating member 38b into which latter the shaft 38a is inserted together with a bearing 38c.

the shaft 38a is fixed to the arm 23, and the rotating member 38b is fixed to a horizontal rod 40. The arm 23 is freely movable relative to the rod 40 within a horizontal plane but they move together within a vertical plane. The rod 40 is inserted into a bearing 39 secured to the device 10. The other end of the rod 40 is connected with a vertical rod 41. The other end of the latter is pulled by a spring 42 to give an upward movement to the flat nozzle 13. The cylindrical member 36 is contacted with the drum 14 by the tension of this spring.

A round projecting member 41a is attached by a shaft to the rod 41 at a location lower than the center of its length, and a rotating cam 43 is provided in a manner so that it contacts the member 41a. A projecting portion 43a of the cam 43 pushes the vertical rod 41 rightward when the cam rotates. At this moment, the horizontal rod 40, fixed to the vertical rod 41 and cooperating with the arm 23, moves the flat nozzle 13 downward from the drum 14.

One end of a connecting rod 44 is connected near the center of the arm 23 by means of a ball joint 45, and the other end of the rod 44 is orthogonally connected with a drive shaft 46. As shown in FIGS. 6 and 7, the rod 44 is connected to the shaft 46 by an eccentric shaft 47 secured to the drive shaft with a ball joint 48 inserted between them. When the shaft 46 rotates, the eccentric shaft 47 gives a horizontal reciprocal movement to the connecting rod 44 and the supporting arm 23 connected to the rod 44. It will be understood that the connecting mechanism and parts 38 through 43a described hereinabove constitute means for intermittently reciprocating the nozzle 13 toward and away from the periphery of the drum 14, while the connecting mechanism with parts 44 through 48 constitute means for intermittently reciprocating the same nozzle 13 substantially parallel to the drum periphery, for the purposes explained in the introduction where primary points of the invention were explained.

A cooling-water tube 49 provided along and extending from the outlet orifice of the flat nozzle 13 prevents the dough from sticking fast to the flat nozzle heated by the drum 14 on account of the heater 16. In FIG. 1, a cooling-water tube 65 is shown, located along the rim of the outlet orifice of the nozzle 13, which is the counterpart of the tube 49 (shown in FIG. 4 only and not visible in FIG. 3). A water-supply tube 66 is also shown in FIG. 1.

The rotation of the gear pump 12 forces the dough from the hopper 11 into the nozzle 13 through the tube 22. The dough is then injected onto the outer circular surface of the drum 14. The thickness of the dough sheet thus obtained depends upon the clearance 24. If the latter increases for a moment, the dough sheet will be interrupted. Therefore, each downward movement of the nozzle 13 at appropriate intervals makes individual dough sheets having the same constant length, and this is done by the operation of the cam 43 which moves the rod 41 and the associated connecting mechanism at intervals.

The dough sheet discharged from the nozzle 13 sticks to the drum 14 and is baked by the heat, which ranges approximately between 70° and 230°C. If the outer circular surface of the drum 14 is finished on a lathe, the dough sheet baked on it has numerous grooves, and they are easily broken. Uneven baking will be caused if the drum is heated unevenly.

In the inventive device for processing dough, the eccentric shaft 47 is fixed to the drive shaft 46, and the shaft 47 gives a horizontal reciprocal movement to the supporting arm 23 in a way that the dough sheet discharged from the nozzle is vibrated, so that no grooves are made on the sheet and no uneven baking occurs. The dough sheets consecutively baked are released from the drum 14 by the releasing plate 15, the end rim of which contacts the outer circular surface of the drum 14.

It should be understood, of course, that the foregoing disclosure relates only to a preferred embodiment and to preferred features of the invention, and that it is intended to cover all changes and modifications of the examples described which do not constitute departures from the spirit and scope of the invention.

What I claim is:

1. A device for processing dough, for the preparation of rolled food consisting of a mixture of minced vegetables, meat and the like, wrapped in a sheet of dough of predetermined size, the device comprising a heated, rotatable drum having a substantially smooth outer circular surface; a flat nozzle adjacent said drum surface, to which dough is supplied and which deposits the dough through an outlet orifice of said nozzle onto said drum surface during the rotation of said drum, which orifice defines a controllable clearance with the periphery of said drum surface; a releasing plate having a stripping edge for removing individual sheets of dough as they are formed on said drum; and means for intermittently reciprocating said nozzle in at least one direction, selectively substantially parallel with said periphery of the drum surface, and toward and away therefrom.

2. The device as defined in claim 1, further comprising a pair of shaft stubs flanking said nozzle; a pair of eccentric rollers supported at a small distance from said stubs; and a pair of cylindrical members secured about said rollers, the outer surfaces of portions of the latter being pivotable in said members; and wherein said means for intermittently reciprocating the nozzle includes cam means and a connecting mechanism, for producing the reciprocation of said nozzle with said shaft stubs between said cylindrical members substantially parallel with said periphery of the drum surface.

3. The device as defined in claim 1, further comprising a supporting arm having one end fixed to said nozzle; and wherein said means for intermittently reciprocating the nozzle includes a connecting mechanism having therein a first rod connected with one end to the other end of said arm for free rotation; a second rod connected with one end to the other end of said first rod; means to bias said second rod into a predetermined position; and said reciprocating means also includes cam means for intermittently rotating said second rod by a certain angle, against the force of said biasing means, for producing the reciprocation of said nozzle toward and away from said periphery of the drum surface.

* * * * *